Figure 1:
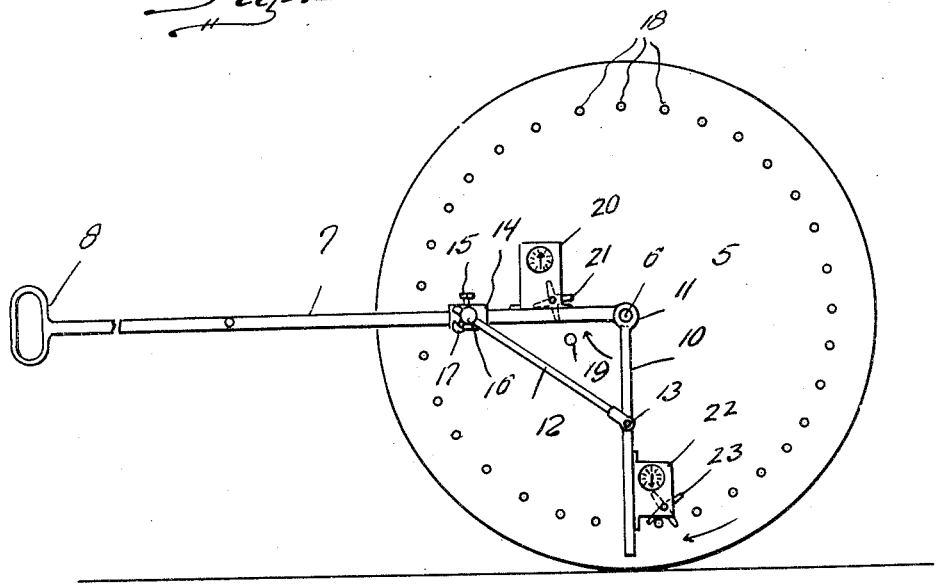

March 27, 1928.

O. V. HOLMQUIST

MEASURING APPARATUS

Filed Feb. 25, 1927

1,663,598

Inventor
O. V. Holmquist,

By Clarence A. O'Brien
Attorney

Patented Mar. 27, 1928.

1,663,598

UNITED STATES PATENT OFFICE.

OSCAR V. HOLMQUIST, OF ST. JAMES, MINNESOTA.

MEASURING APPARATUS.

Application filed February 25, 1927. Serial No. 170,865.

The present invention relates to a measuring apparatus and has for its prime object to provide an exceedingly simple structure which may be manufactured at a low cost for measuring land for the purpose of fence-building and the like.

Another important object of the invention lies in the provision of a measuring apparatus of this nature which is thoroughly efficient and reliable in operation, strong and durable, easy to manipulate, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 2:
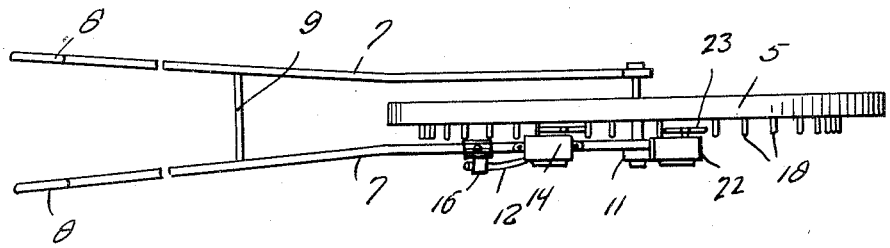
Figure 3:
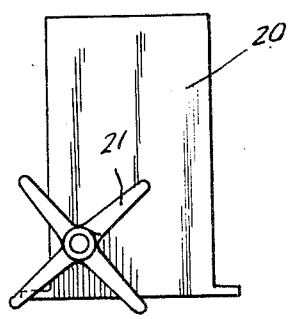

Figure 1 is a side elevation of the apparatus embodying the features of my invention, Fig. 2 is a top plan view thereof, Fig. 3 is a detail elevation of one of the counting mechanisms.

Referring to the drawing in detail it will be seen that the numeral 5 denotes a disk having an axle pin 6 extending through the center thereof an equal distance to each side. Handle bars 7 have their forward ends on the axle pin 6 and terminate in grip portions 8. These handle bars are connected intermediate their ends by a cross rod 9. An arm 10 depends from one end of the axle pin 6. This arm 10 is rotatable on the axle pin having its upper end terminating in an eye 11 for this purpose. A link 12 is pivoted as at 13 to an intermediate portion of the arm 10. A sleeve 14 is slidable on one of the bars 7 and is held in different adjusted positions by a set screw 15. A projection 16 is provided on the sleeve 14 and the link rod 12 extends therethrough being held in different adjusted positions by a set screw 17. A plurality of pegs 18 project laterally from the wheel or disk 5 adjacent the periphery thereof. A single peg 19 projects laterally from the disk 5 adjacent the center thereof. A counting mechanism 20 is mounted on one bar 7 and is actuatable by a toothed member 21 engageable by the peg 19. A similar counting mechanism 22 is mounted on the arm 10 and is actuatable by the member 23 engageable by the pegs 18. By way of example in the present instance the circumference of the disk 5 is representative of a rod and there are 33 pegs 18. It will be seen that the arm 10 may be adjusted to start the apparatus at a predetermined point by pushing the same along and the ground over which it travels may be measured linearly.

It is thought that the construction, operation, and advantages of this invention will be clearly understood by those skilled in this art. It will be seen that the present embodiment of the invention which I have disclosed merely by way of example attains the features of advantage enumerated as desirable in the statement of the invention and the above description. It is apparent that changes in the details of construction may be resorted to without departing from the spirit or scope of the invention as hereinafter claimed or sacrificing any of its advantages.

Having thus described my invention, what I claim as new is:—

1. An apparatus of the class described, including, in combination, a disk, a peg adjacent the center of the disk, a series of pegs in annular arrangement adjacent the periphery of the disk, an axle pin extending through the center of the disk, handle bars engaged with the ends of the axle pin, a counter mechanism on one handle bar, a toothed member operatively connected with the counting mechanism for operation thereof, an arm rotatable on one end of the axle pin, a counting mechanism mounted on the arm, a toothed member operatively connected with the second mentioned counting mechanism for operation thereof, the toothed member on the first mentioned counting mechanism being actuatable by the first peg, and the toothed member on the second counting mechanism being operable by the series of pegs, and means for adjusting the arms in respect to the handle bars.

2. An apparatus of the class described including, in combination, a disk, a peg adjacent the center of the disk, a series of pegs in annular arrangement adjacent the periphery of the disk, an axle pin extending through the center of the disk, handle bars engaged with the ends of the axle pin, a counter mechanism on one handle bar, a toothed member operatively connected with the counting mechanism for operation thereof, an arm rotatable on one end of the axle pin, a counting mechanism mounted on the arm, a toothed member operatively connected with the second mentioned counting mechanism for operation thereof, the toothed member on the first mentioned counting mechanism being actuatable by the first peg, and the toothed member on the second counting mechanism being operable by the series of pegs, a sleeve slidable on one of the bars, means for holding the sleeve in different adjusted positions, a link rod to pivotally engage with an intermediate portion of the arm, a projection on the sleeve through which the link is slidable, and means for holding the link in different adjusted positions in relation to said projection.

In testimony whereof I affix my signature.

OSCAR V. HOLMQUIST.